(12) United States Patent
Raman et al.

(10) Patent No.: US 12,541,391 B2
(45) Date of Patent: Feb. 3, 2026

(54) METHODS AND SYSTEMS FOR VIRTUAL MACHINE MIGRATION DURING CONTROLLER OUTAGES

(71) Applicant: VMware LLC, Palo Alto, CA (US)

(72) Inventors: Chidambareswaran Raman, Sunnyvale, CA (US); Subin Cyriac Mathew, San Jose, CA (US); Li Sun, Sunnyvale, CA (US)

(73) Assignee: VMware LLC, Palo Alto, CA (US)

( * ) Notice: Subject to any disclaimer, the term of this patent is extended or adjusted under 35 U.S.C. 154(b) by 462 days.

(21) Appl. No.: 18/198,247

(22) Filed: May 16, 2023

(65) Prior Publication Data

US 2024/0385863 A1    Nov. 21, 2024

(51) Int. Cl.
*H04L 41/0853* (2022.01)
*G06F 3/0482* (2013.01)
(Continued)

(52) U.S. Cl.
CPC ........ *G06F 9/45558* (2013.01); *G06F 3/0482* (2013.01); *H04L 41/0853* (2013.01);
(Continued)

(58) Field of Classification Search
CPC .............. G06F 9/45558; G06F 3/0482; G06F 2009/4557; G06F 2009/45595;
(Continued)

(56) References Cited

U.S. PATENT DOCUMENTS

| | | | |
|---|---|---|---|
| 9,858,100 B2 * | 1/2018 | Thakkar | G06F 9/50 |
| 10,200,274 B1 * | 2/2019 | Suryanarayana | H04L 49/70 |

(Continued)

FOREIGN PATENT DOCUMENTS

| | | | | |
|---|---|---|---|---|
| AU | 2015255293 A1 | * | 12/2015 | |
| CN | 103930882 B | * | 10/2017 | ......... H04L 41/0803 |
| CN | 110870290 A | * | 3/2020 | ............. G06F 3/455 |

OTHER PUBLICATIONS

Sidki et al., "Fault Tolerant Mechanism for SDN Controllers," 2016 IEEE Conference on Network Function Virtualization and Software Defined Networks (NFV-SDN). (Year: 2016).*

(Continued)

*Primary Examiner* — Alina A Boutah
(74) *Attorney, Agent, or Firm* — Quarles & Brady LLP

(57) ABSTRACT

Some embodiments provide a novel method for migrating a virtual machine (VM) from a first host computer to a second host computer in a software-defined network (SDN) when a set of controllers of the SDN, that configures several forwarding elements in the SDN to implement one LFE, is unavailable. The second host receives information regarding the VM from the first host. The VM is associated with the LFE. The second host retrieves, from a local data store of the second host, configuration information for configuring at least one software forwarding element executing on the second host to implement the LFE. The configuration information was previously received from the controller set when it was available to pre-configure the second host to implement the LFE without assistance from the controller set when the VM migrates to the second host. The second host uses the received information for the VM and the retrieved configuration information for the LFE to instantiate the VM on the second host without requesting any information from the controller set.

20 Claims, 12 Drawing Sheets

(51) Int. Cl.
*G06F 9/455* (2018.01)
*H04L 41/0895* (2022.01)
*H04L 41/22* (2022.01)
*H04L 41/342* (2022.01)
*H04L 45/586* (2022.01)

(52) U.S. Cl.
CPC .......... *H04L 41/0895* (2022.05); *H04L 41/22* (2013.01); *H04L 41/342* (2022.05); *H04L 45/586* (2013.01); *G06F 2009/4557* (2013.01); *G06F 2009/45595* (2013.01)

(58) Field of Classification Search
CPC . H04L 41/0853; H04L 41/0895; H04L 41/08; H04L 41/22; H04L 41/342; H04L 45/586
See application file for complete search history.

(56) References Cited

U.S. PATENT DOCUMENTS

| | | | | |
|---|---|---|---|---|
| 10,313,186 | B2* | 6/2019 | Wang | G06F 16/258 |
| 10,764,112 | B2* | 9/2020 | Chandrashekhar | H04L 41/046 |
| 11,153,170 | B1* | 10/2021 | Chandrashekhar | G06F 11/3409 |
| 2008/0270564 | A1* | 10/2008 | Rangegowda | G06F 9/45558 709/212 |
| 2013/0125120 | A1* | 5/2013 | Zhang | G06F 9/455 718/1 |
| 2015/0009804 | A1* | 1/2015 | Koponen | H04L 41/0695 370/219 |
| 2016/0057005 | A1* | 2/2016 | Thakkar | G06F 11/2033 714/4.11 |
| 2017/0010839 | A1* | 1/2017 | Masuda | G06F 3/0619 |
| 2017/0195254 | A1* | 7/2017 | Pham | H04L 45/745 |
| 2018/0123903 | A1* | 5/2018 | Holla | H04L 41/22 |
| 2019/0097966 | A1* | 3/2019 | Hu | H04L 61/5014 |
| 2020/0007629 | A1* | 1/2020 | Tse | H04L 43/20 |
| 2020/0045148 | A1* | 2/2020 | Mishra | H04L 12/4633 |
| 2022/0103487 | A1* | 3/2022 | Ang | H04L 49/109 |
| 2022/0210047 | A1* | 6/2022 | Venkatasubbaiah | H04L 45/02 |
| 2023/0222361 | A1* | 7/2023 | Vijayvargiya | G06F 8/60 706/46 |

OTHER PUBLICATIONS

Yeganeh et al., "Kandoo: A Framework for Efficient and Scalable Offloading of Control Applications," University of Toronto, ACM. (Year: 2012).*
McKeown et al., "OpenFlow: Enabling Innovation in Campus Networks," ACM SIGCOMM Computer Communication Review, vol. 38, No. 2, Apr. 2008 (Year: 2008).*
Cziva et al., "SDN-Based Virtual Machine Management for Cloud Data Centers," IEEE Transactions on Network and Service Management, vol. 13, No. 2, Jun. 2016. (Year: 2016).*
Non-Published Commonly Owned Related U.S. Appl. No. 18/198,245 with similar specification, filed May 16, 2023, 46 pages, VMware, Inc.

* cited by examiner

METHODS AND SYSTEMS FOR VIRTUAL MACHINE MIGRATION DURING CONTROLLER OUTAGES

BACKGROUND

The controller is an integral part of a software-defined network (SDN). Typically a controller is implemented as a cluster of multiple nodes. However, the whole cluster of controller nodes can go down due to critical bugs, hardware failures, network partition, etc. vMotion (i.e., migration) enables live migration of running virtual machines (VMs) from one physical host to another with zero downtime. When a user tries to migrate a VM from one host to another during a controller outage, datapath connectivity is lost because the destination host cannot receive necessary configuration information from the controller. Hence, methods and systems are needed to support VM migration during controller outages.

BRIEF SUMMARY

Some embodiments provide a novel method for efficiently providing logical forwarding element (LFE) information needed for virtual machine (VM) migration to hosts in a software-defined network (SDN). A set of one or more controllers that configures several forwarding elements in the SDN to implement one LFE identifies a subset of one or more host computers in the SDN as a group of designated host computers for migrating one or more VMs. The controller set retrieves, from a data store, configuration information for configuring any software forwarding element executing on any designated host computer to implement the LFE. The controller set provides the retrieved configuration information to each particular host computer in the subset of host computers before any VM is migrated to the particular host computer, in order to pre-configure the particular host computer to implement the LFE without assistance from the set of controllers when a VM migrates to the particular host computer.

In some embodiments, the LFE is a logical router, and the retrieved configuration information includes information regarding the logical router and one or more logical router ports of the logical router. In other embodiments, the LFE is a logical switch, and the retrieved configuration information includes information regarding the logical switch. The configuration information is used by host computers in the SDN when instantiating a VM that migrated from another host. The retrieved configuration information for a logical switch in some embodiments does not include logical switch port information because this information is provided during migration to the destination host from the source host. However, in other embodiments, the retrieved configuration information for a logical switch also includes logical switch port information.

The subset of host computers is identified by the controller set in some embodiments by receiving a user-specified list indicating the subset of host computers as the group of designated hosts. The user-specified list indicating the subset of host computers as designated hosts in some embodiments is received from a set of one or more management servers in the SDN. These management servers implement a management plane for the SDN in some embodiments. The management plane is responsible for managing the components in the SDN including the controller set. In some embodiments, the management plane receives the user-specified list indicating the subset of host computers as designated hosts in an Application Programming Interface (API) call from a user. In such embodiments, the user may send a Representational State Transfer (REST) API. In other embodiments, the user-specified list is received through a graphical user interface (GUI). In these embodiments, the GUI includes a drop down menu for the user to select one or more host computers in the SDN to include in the subset of host computers.

In some embodiments, the controller set implements a central control plane (CCP) of the SDN. The CCP in some embodiments configures the SDN based on direction from the management plane. In some embodiments, the CCP provides the retrieved configuration information to each host computer in the subset of host computers to a local control plane (LCP) module at each host computer in the subset of host computers. The LCP modules and CCP collectively implement the control plane of the SDN.

The controller set of some embodiments receives, from each host computer in the subset of host computers, a network address of the host computer. In such embodiments, the controller set uses the received network addresses to create a network address list that includes a network address for each host computer in the subset of host computers. The controller set distributes the network address list to each host computer in the SDN not included in the subset of host computers.

By providing the network address list to the other host computers in the SDN, the host computers are able to identify the designated hosts and migrate VMs to the designated hosts when the controller set is unavailable. The designated hosts can instantiate VMs when the controller set is unavailable because they already store the configuration information for the LFE needed for instantiating the VMs. In some embodiments, the network address list is also provided to each host computer in the subset of host computers. In such embodiments, the designated hosts can then migrate VMs to other designated hosts when the controller set is unavailable.

In some embodiments, before identifying the subset of host computers and retrieving the configuration information for the LFE, the controller set receives a set of configuration data for the LFE. The set of configuration data is in some embodiments received from the management plane of the SDN for the controller set to configure the LFE. In such embodiments, the controller set extracts the configuration information from the set of configuration data, stores the configuration information in the data store, and configures the LFE in the SDN.

The received set of configuration data is in some embodiments a first set of configuration data, the LFE is a first LFE, and the configuration information is a first set of configuration information. In such embodiments, after providing the first set of configuration information, the controller set receives a second set of configuration data for a second LFE, extracts a second set of configuration information from the second set of configuration data, stores the second set of configuration information in the data store, configures the second LFE in the SDN, and provides the second set of configuration information to each host computer in the subset of host computers. The second set of configuration data in some embodiments specifies configuration data for a new LFE to be implemented in the SDN. In other embodiments, it specifies changes or updates to the already implemented LFE in the SDN.

Some embodiments provide a novel method for migrating a particular VM from a first host computer to a second host computer in an SDN when a set of one or more controllers of the SDN, that configures several forwarding elements in the SDN to implement one LFE, is unavailable. The second host computer receives information regarding the particular VM from the first host computer. The particular VM is associated with the LFE. The second host computer retrieves, from a local data store of the second host computer, configuration information for configuring at least one software forwarding element executing on the second host computer to implement the LFE. The configuration information was previously received from the set of controllers when the set of controllers was available in order to pre-configure the second host computer to implement the LFE without assistance from the set of controllers when the particular VM migrates to the second host computer. The second host computer uses the received information for the particular VM and the retrieved configuration information for the LFE to instantiate the particular VM on the second host computer without requesting any information from the set of controllers.

In some embodiments, the information received from the second host computer includes one or more of configuration information, network forwarding information, and middlebox service information related to the particular VM. This information is received by the second host computer in order to properly instantiate the particular VM on the second host computer. The LFE is in some embodiments a logical router, and the retrieved set of configuration information for the LFE is information relating to the logical router and one or more logical router ports of the logical router. In other embodiments, the LFE is a logical switch, and the retrieved set of configuration information for the LFE is information relating to the logical switch. In some embodiments, the retrieved LFE information for a logical switch does not include logical switch port information because the information received from the first host computer includes configuration information relating to one or more logical switch ports of the logical switch.

After instantiating the particular VM on the second host computer, the second host computer in some embodiments updates the configuration information for the LFE to indicate that the particular VM now executes on the second host computer. For instance, if the configuration information defined the span of the LFE to include the first host computer and not the second host computer, the second host computer has to update the configuration information for the LFE to update the span of the LFE to include the second host computer.

In some embodiments, the updated configuration information does not include the first host computer in the span because the particular VM was removed from the first host computer and no other VMs executing on the first host computer are associated with the LFE. In other embodiments, the updated configuration information still includes the first host computer in the span because at least one other VM on the first host computer is associated with the LFE.

After updating the configuration information, the second host computer distributes the updated configuration information to a set of host computers in the SDN. In some embodiments, the set of host computers includes host computers associated with the LFE and host computers that also store the configuration information for the LFE. The set of host computers associated with the LFE are provided the updated configuration information so they can update the span of the LFE. The host computers that also store the configuration information for the LFE are provided the updated configuration information because they need to maintain up-to-date configuration information for the SDN such that VMs can be migrated to them when the controller set is unavailable.

In some embodiments, the second host computer is designated by a user as a designated host of the SDN. In such embodiments, a set of one or more designated hosts, including the second host computer, is designated by the user for storing the configuration information needed for migration and for being destination hosts of migrating VMs when the set of controllers is unavailable. The designated hosts are selected by the user so the controller set can provide them with the SDN's configuration information, and so that host computers in the SDN can migrate VMs to them without assistance from the controller set.

The first host computer of some embodiments stores a list specifying the set of designated hosts in order to migrate the particular VM when the set of controllers is unavailable. This list is in some embodiments provided by the controller set to the first host computer. In some embodiments, the list is provided to all host computers that are not designated hosts in the SDN. In other embodiments, it is also provided to the designated hosts so they can migrate VMs when the controller set is unavailable. The list in some embodiments specifies a network address for each designated host.

In some embodiments, the user specifies the set of designated hosts through a set of one or more management servers (i.e., the management plane) of the SDN. The user in some embodiments specifies the list using an API call, such as a REST API call. In other embodiments, the user specifies the list through a GUI (e.g., through a drop down menu for the user to select one or more host computers in the SDN to include in the set of designated hosts).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
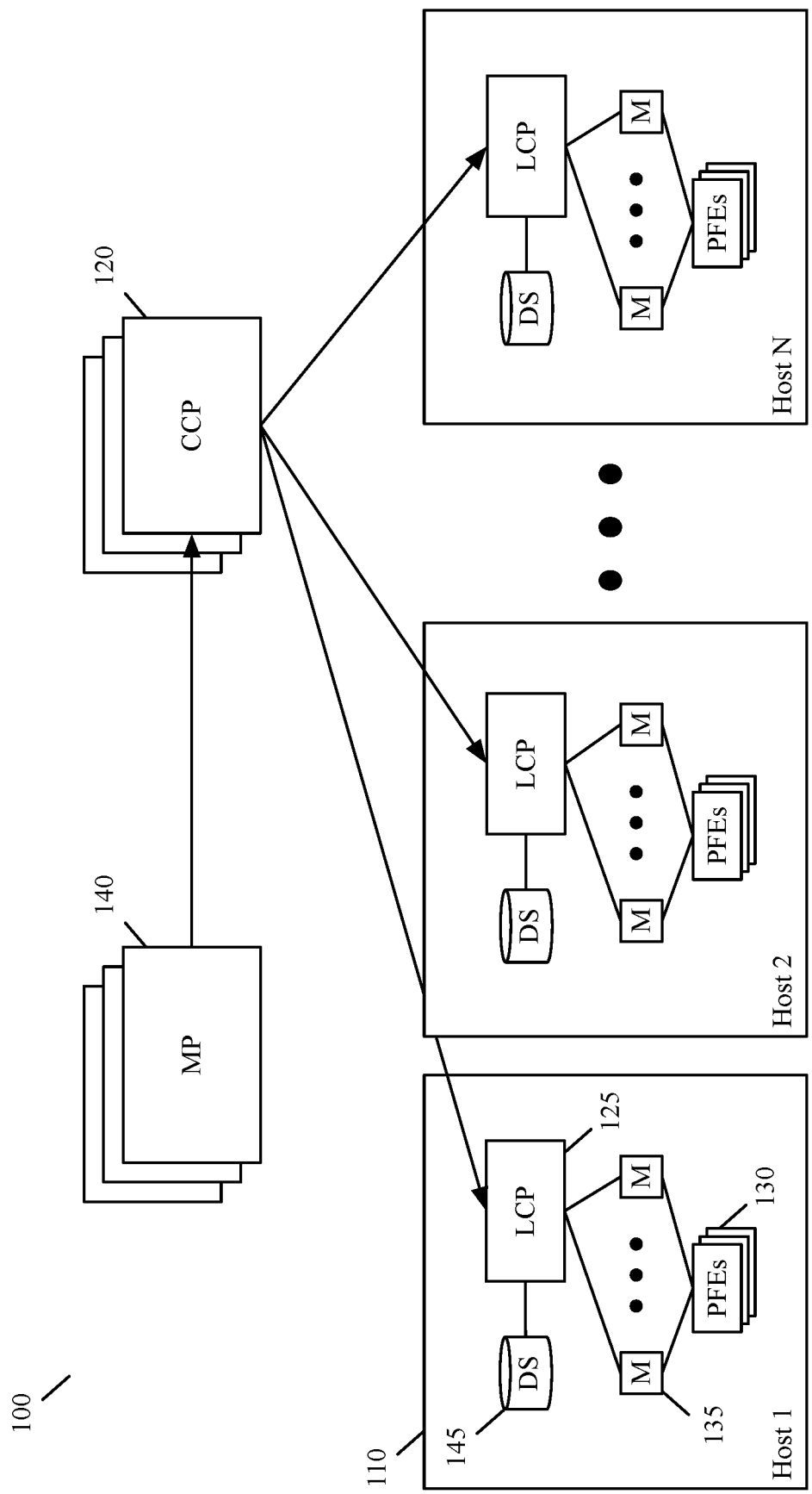
FIG. 1 illustrates an example SDN in which some embodiments of the invention are implemented.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for efficiently providing logical forwarding element (LFE) information needed for virtual machine (VM) migration to hosts in a software-defined network (SDN). A set of one or more controllers that configures several forwarding elements in the SDN to implement one LFE identifies a subset of one or more host computers in the SDN as a group of designated host computers for migrating one or more VMs. The controller set retrieves, from a data store, configuration information for configuring any software forwarding element executing on any designated host computer to implement the LFE. The controller set provides the retrieved configuration information to each particular host computer in the subset of host computers before any VM is migrated to the particular host computer, in order to pre-configure the particular host computer to implement the LFE without assistance from the set of controllers when a VM migrates to the particular host computer.

In some embodiments, the LFE is a logical router, and the retrieved configuration information includes information regarding the logical router and one or more logical router ports of the logical router. In other embodiments, the LFE is a logical switch, and the retrieved configuration information includes information regarding the logical switch. The configuration information is used by host computers in the SDN when instantiating a VM that migrated from another host. The retrieved configuration information for a logical switch in some embodiments does not include logical switch port information because this information is provided during migration to the destination host from the source host. However, in other embodiments, the retrieved configuration information for a logical switch also includes logical switch port information.

The subset of host computers is identified by the controller set in some embodiments by receiving a user-specified list indicating the subset of host computers as the group of designated hosts. The user-specified list indicating the subset of host computers as designated hosts in some embodiments is received from a set of one or more management servers in the SDN. These management servers implement a management plane for the SDN in some embodiments. The management plane is responsible for managing the components in the SDN including the controller set. In some embodiments, the management plane receives the user-specified list indicating the subset of host computers as designated hosts in an Application Programming Interface (API) call from a user. In such embodiments, the user may send a Representational State Transfer (REST) API. In other embodiments, the user-specified list is received through a graphical user interface (GUI). In these embodiments, the GUI includes a drop down menu for the user to select one or more host computers in the SDN to include in the subset of host computers.

In some embodiments, the controller set implements a central control plane (CCP) of the SDN. The CCP in some embodiments configures the SDN based on direction from the management plane. In some embodiments, the CCP provides the retrieved configuration information to each host computer in the subset of host computers to a local control plane (LCP) module at each host computer in the subset of host computers. The LCP modules and CCP collectively implement the control plane of the SDN.

Some embodiments provide a novel method for migrating a particular VM from a first host computer to a second host computer in an SDN when a set of one or more controllers of the SDN, that configures several forwarding elements in the SDN to implement one LFE, is unavailable. The second host computer receives information regarding the particular VM from the first host computer. The particular VM is associated with the LFE. The second host computer retrieves, from a local data store of the second host computer, configuration information for configuring at least one software forwarding element executing on the second host computer to implement the LFE. The configuration information was previously received from the set of controllers when the set of controllers was available in order to pre-configure the second host computer to implement the LFE without assistance from the set of controllers when the particular VM migrates to the second host computer. The second host computer uses the received information for the particular VM and the retrieved configuration information for the LFE to instantiate the particular VM on the second host computer without requesting any information from the set of controllers.

In some embodiments, the information received from the second host computer includes one or more of configuration information, network forwarding information, and middlebox service information related to the particular VM. This information is received by the second host computer in order to properly instantiate the particular VM on the second host computer. The LFE is in some embodiments a logical router, and the retrieved set of configuration information for the LFE is information relating to the logical router and one or more logical router ports of the logical router. In other embodiments, the LFE is a logical switch, and the retrieved set of configuration information for the LFE is information relating to the logical switch. In some embodiments, the retrieved LFE information for a logical switch does not include logical switch port information because the information received from the first host computer includes configuration information relating to one or more logical switch ports of the logical switch.

After instantiating the particular VM on the second host computer, the second host computer in some embodiments updates the configuration information for the LFE to indicate that the particular VM now executes on the second host computer. For instance, if the configuration information defined the span of the LFE to include the first host computer and not the second host computer, the second host computer has to update the configuration information for the LFE to update the span of the LFE to include the second host computer.

In some embodiments, the updated configuration information does not include the first host computer in the span because the particular VM was removed from the first host computer and no other VMs executing on the first host computer are associated with the LFE. In other embodiments, the updated configuration information still includes the first host computer in the span because at least one other VM on the first host computer is associated with the LFE.

After updating the configuration information, the second host computer distributes the updated configuration information to a set of host computers in the SDN. In some embodiments, the set of host computers includes host computers associated with the LFE and host computers that also store the configuration information for the LFE. The set of host computers associated with the LFE are provided the updated configuration information so they can update the span of the LFE. The host computers that also store the configuration information for the LFE are provided the updated configuration information because they need to maintain up-to-date configuration information for the SDN such that VMs can be migrated to them when the controller set is unavailable.

FIG. 1 illustrates an example SDN 100. The SDN 100 includes hosts 110. Each host 110 includes one or more PFEs 130 and one or more machines 135. The PFEs 130 executing on the hosts 110 are configured to implement a conceptual data plane through which the PFEs 130 exchange data messages with each other. In some embodiments, the PFEs 130 are configured to implement one or more LFEs (not shown), and the data plane is implemented by one LFE or by a set of related LFEs, e.g., by a set of connected logical switches and logical routers. In some embodiments, the SDN 100 has several components (e.g., servers, VMs, host computer modules, etc.) that implement the control plane through which the PFEs 130 are configured to implement a data plane. These control-plane components include a central control plane (CCP) 120 that includes a set of controllers, and local control-plane (LCP) modules 125 operating on the hosts 110. In some embodiments, the SDN 100 also includes one or more standalone PFE devices, such as hardware switches and routers. In such embodiments, an LCP module operates on each standalone PFE device. The CCP 120 of the control plane operates on one host in the SDN 100, and one LCP module operates on each other host computer 110 and hardware PFE 130 in the SDN 100.

The SDN 100 of some embodiments also includes a management plane (MP) implemented by a set of management servers 140. The MP interacts with and receives input data from users, which is relayed to the CCP 120 to configure the PFEs 130. In some embodiments, the MP also receives input data from hosts in the SDN 100 and/or PFEs in the SDN 100, and, based on that input data, manages the control plane. In some embodiments, the management servers 140 process the input data before providing it to the control-plane components 120 and 125. In other embodiments, the management servers 140 provide the input data to the control-plane components 120 and 125 directly as it is given to the management servers 140. The management servers 140 also in some embodiments receive data from PFEs 130 and/or LFEs of the SDN 100, such as topology data, and the management servers 140 use this data to configure the CCP 120. In some embodiments, the hosts 110 also include local management-plane (LMP) modules (not shown). In such embodiments, the management servers 140 communicate with the LMP modules to configure the CCP 120 and the LCP modules 125.

As discussed above, the control plane (i.e., the CCP 120 and the LCP modules 125) configures the PFEs 130 to implement a data plane. The configured PFEs 130 may also implement one or more LFEs to implement the data plane. The machines 135 are the sources and destinations of data messages exchanged using the PFEs 130. In the event of a machine migration from a first host to a second host, the second host needs to receive information regarding logical entities (e.g., logical routers, logical router ports, logical switches, etc.) associated with the migrating machine. This is provided to the second host in some embodiments by the CCP 120. In some embodiments, it is received at the LCP module 125 of the second host and stored in a data store 145.

In some embodiments, the CCP 120 is unavailable to provide this information, e.g., if all controllers of the CCP 120 have failed and not yet restarted. When this occurs, the CCP 120 is unable to provide the second host with the necessary logical entity information (also referred to as LFE information) in order to properly migrate the machine. In some embodiments, to obviate this issue before a machine migration occurs, a user specifies, to the MP 140, a set of one or more designated hosts that is a subset of the hosts 110. These designated hosts include hosts to which machines can be migrated when the CCP 120 is down. The user of some embodiments sends to the MP 140 a list of each host the user wishes to designate as a designated host. In some embodiments, this list is provided to the MP 140 in the form of an Application Programming Interface (API) call, such as a Representational State Transfer (REST) API. In other embodiments, the user specifies the designated hosts in a graphical user interface (GUI) (e.g., using a drop-down window in the GUI). In some embodiments, to provide the list, the user specifies, for each host in the SDN, an identifier (ID) for the host and a specification of whether to designate it or not.

The MP 140 provides the designated host list to the CCP 120, which provides all logical entity information to each designated host's LCP module 125. In some embodiments, the CCP 120 also provides the logical entity information to each non-designated host, and notifies each non-designated host to migrate machines to only designated hosts. In some embodiments, one or more designated hosts send to the CCP 120 a list of designated host virtual extensible local area network (VXLAN) tunnel endpoints (VTEPs), i.e., Internet Protocol (IP) addresses of the designated hosts. The CCP 120 provides this VTEP list to all non-designated hosts in a routing information base (RIB) message for the non-designated hosts to store. Then, if the CCP 120 is unavailable during a machine migration, the machine is migrated to a designated host, which already has the necessary logical entity information.

Figure 2:
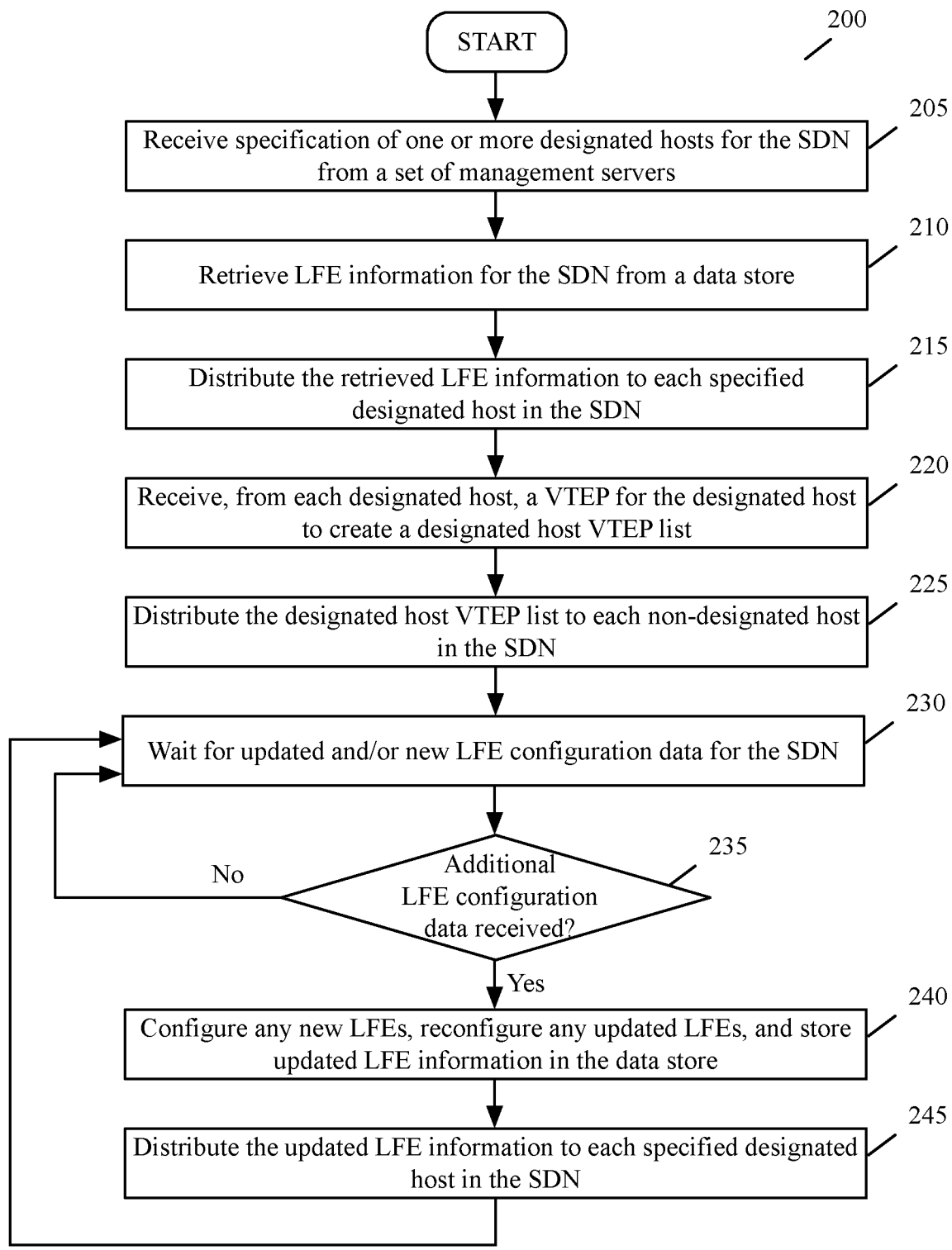
FIG. 2 conceptually illustrates a process of some embodiments for efficiently providing LFE information needed for machine migration to hosts in an SDN.

FIG. 2 conceptually illustrates a process 200 of some embodiments for efficiently providing LFE information needed for machine migration to hosts in an SDN. This process 200 is in some embodiments performed by a set of one or more controllers implementing a control plane of an SDN, such as the controller set implementing the CCP 120 of FIG. 1. In some embodiments, the process 200 is performed after a user has specified, to a set of management servers in the SDN, a subset of designated hosts for the SDN.

The process 200 begins by receiving (at 205) specification of one or more designated hosts for the SDN from a set of one or more management servers, i.e., from the management plane of the SDN. In some embodiments, the controller set receives a list of host IDs for each host the user selected as a designated host. In other embodiments, the controller set receives a list of host IDs for each host in the SDN, and a specification for each host specifying whether it is a designated host or not.

After receiving the specification of the one or more designated hosts, the process 200 retrieves (at 210) LFE information for the SDN from a data store. In some embodiments, the controller set stores all LFE information for the SDN in a local data store or memory. In some embodiments, the data store is a database. The LFE information in some embodiments identifies which hosts, PFEs, and machines in the SDN are associated with each logical element established in the SDN. In some embodiments, the LFE information includes information regarding all logical routers, logical router ports, and logical switches in the SDN. In other embodiments, the LFE information also includes information regarding the logical switch ports in the SDN.

Then, the process 200 distributes (at 215) the retrieved LFE information to each specified designated host in the SDN. In some embodiments, the controller set provides the LFE information to each designated host by providing the LFE information to each designated host's LCP module. Each LCP module in some embodiments stores the received LFE information in a data storage of the designated host.

At 220, the process 200 receives, from each designated host, a VTEP for the designated host to create a designated host VTEP list. In some embodiments, each designated host, after receiving the LFE information, provides back to the controller set its VTEP in order for the controller set to create a list of all designated hosts' VTEPs. The VTEP list in some embodiments includes an IP address for each designated host. Then, the process 200 distributes (at 225) the designated host VTEP list to each non-designated host in the SDN. In some embodiments, the VTEP list is provided to the non-designated hosts in an RIB message. By providing the VTEP list to each non-designated host, the non-designated hosts are able to migrate machines to any of the designated hosts when the controller set is unavailable. In some embodiments, the VTEP list is also provided to the designated hosts of the SDN so that the designated hosts can also migrate machines when the controller set is unavailable.

At 230, the process waits for additional LFE configuration data for the SDN. In some embodiments, a user can specify additional LFEs or change the configuration LFEs by using the set of management servers in the SDN. The controller set of some embodiments waits to receive additional LFE configuration data from the set of management servers that would reconfigure any current LFEs and/or configure new LFEs. After step 230, the process 200 determines (at 235) whether any additional LFE configuration data has been received. In some embodiments, a user creates new LFEs by specifying the PFEs that implement them and the associated machines to the set of management servers in the SDN. Conjunctively or alternatively, the user specifies any changes to any LFEs to the management servers. The management servers provide configuration data for the new and/or updated LFEs to the controller set to configure the new and/or updated LFEs in the SDN. In some embodiments, the management servers receive user-specified data and convert the user-specified data into the configuration data for the controller set. In other embodiments, the management servers receive the configuration data directly from the user and simply provide it to the controller set.

If the process 200 determines that no additional LFE configuration data has been received, the process 200 returns to step 230 to keep waiting for additional LFE configuration data for the SDN. In some embodiments, the process 200 waits indefinitely for the controller set to receive additional LFE configuration data. In other embodiments, the controller waits a particular time period (e.g., specified by the user) for additional LFE configuration data before ending the process 200.

If the process 200 determines that additional LFE configuration data has been received, the process 200 configures (at 240) any new LFEs, reconfigures any updated LFEs, and stores updated LFE information in the data store. Using the received additional LFE configuration data, the controller set configures new LFEs and makes changes to any LFEs that need to be updated. The controller set of some embodiments stores the newly received LFE information in a data store, which can be retrieved by the controller set when a machine migrates from one host computer to another in the SDN.

At 245, the process 200 distributes the updated LFE information to each specified designated host in the SDN. In some embodiments, the controller set provides the updated LFE information to each designated host by providing the updated LFE information to each designated host's LCP module. Each LCP module in some embodiments stores the received updated LFE information in a data storage of the designated host. In some embodiments, the controller set only distributes new or updated LFE information to the designated hosts, and not LFE information the designated hosts already received at step 215. In other embodiments, the controller set distributes all LFE information for the SDN to the designated hosts, including LFE information the designated hosts already have stored. After distributing the updated LFE information, the process 200 returns to step 230 to wait for additional LFE configuration data.

The process 200 of some embodiments is performed each time the management plane of the SDN receives a list of designated hosts from a user. For instance, the process 200 is performed after the management plane receives an initial list of designated hosts for the SDN, and after an updated list of designated hosts is received from the user.

Figure 3:
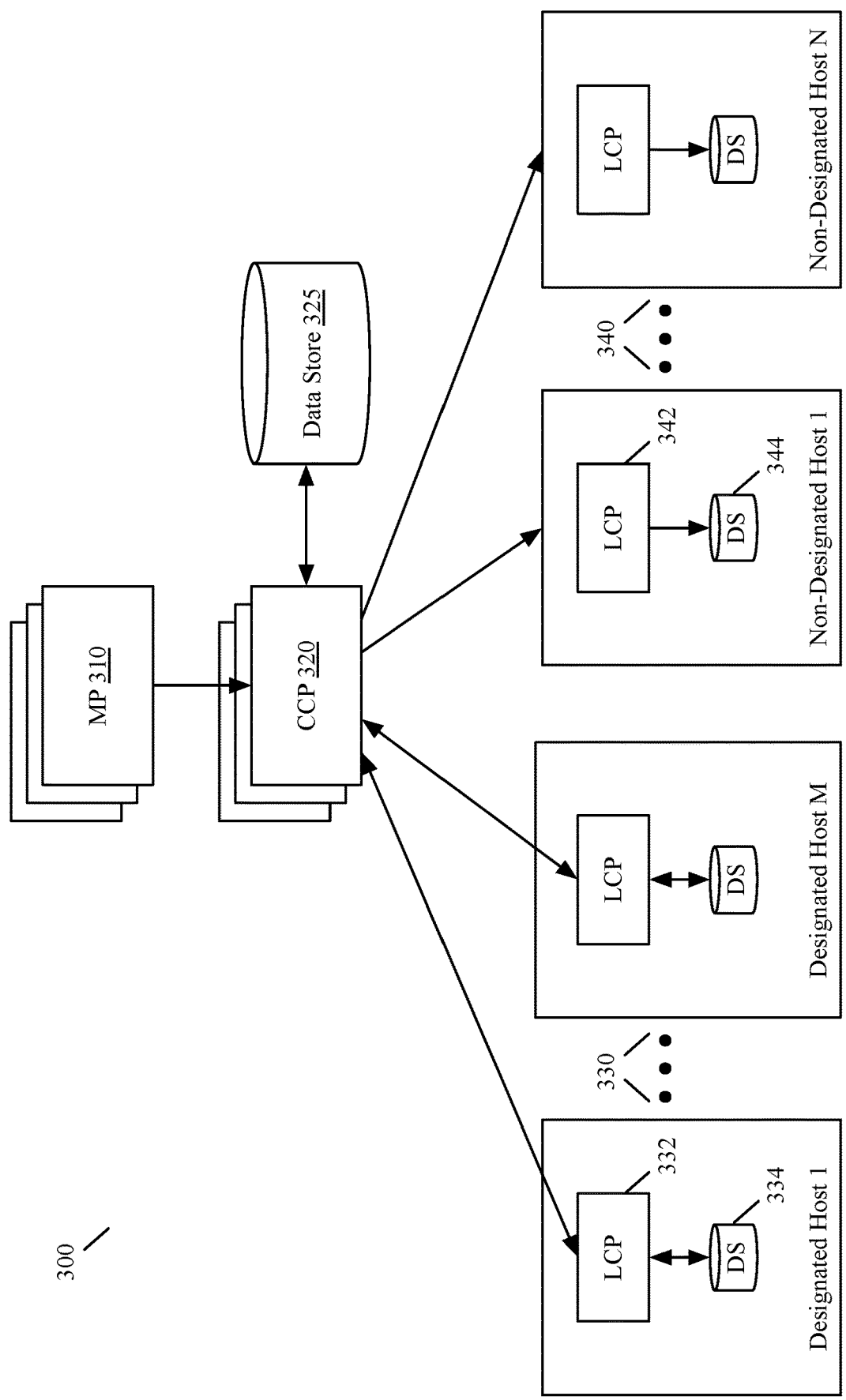
FIG. 3 illustrates an example SDN that distributes information among hosts based on user-specified data.

FIG. 3 illustrates an example SDN 300 that distributes information among hosts based on user-specified data. The SDN 300 includes a set of one or more management servers implementing an MP 310, a set of one or more controllers implementing a CCP 320, and hosts 330 and 340. The MP 310 receives specification data from a user specifying a list of designated hosts 330. A user can specify any number of hosts in the SDN 300 as designated hosts 330.

After receiving the list of designated hosts 330 from the user, the MP 310 provides this list to the CCP 320. The CCP 320 then retrieves LFE information for the SDN 300 from a data store 325. In some embodiments, the data store 325 resides on the same host or appliance as one or more of the controllers implementing the CCP 320. The data store 325 in some embodiments stores information regarding all logical routers, logical router ports, logical switches, and logical switch ports in the SDN 300. In some embodiments, the CCP 320 retrieves only some of this LFE information. For example, the CCP 320 of some embodiments only retrieves logical router, logical router port, and logical switch information. The CCP 320 may not retrieve logical switch port information in order to save storage space in each of the designated hosts 330.

After retrieving the LFE information, the CCP 320 provides the LFE information to the designated hosts 330, more specifically, to the LCP modules 332 of the designated hosts 330. Each LCP module 332 stores the LFE information in a data store 334 of their designated host 330. After receiving LFE information, each LCP module 332 of the designated hosts 330 in some embodiments provide their designated host's VTEP to the CCP 320. In some embodiments, each designated host 330 provides their own VTEP. An LCP module 332 of some embodiments stores their designated host's VTEP in the data store 334 or in a local memory of the host.

In other embodiments, one designated host is designated as a primary designated host by the user and is notified that it is the primary by the CCP 320. In such embodiments, the primary designated host receives, along with the LFE information, the list of designated hosts from the CCP 320, retrieves all VTEPS for all designated hosts 330, and provides the VTEPs to the CCP 320. The primary designated host of some embodiments stores VTEPs for all hosts in a local data store (such as the data store 334) or in a local memory. In other embodiments, the primary designated host requests the VTEP for each designated host 330 before providing them to the CCP 320.

After receiving the VTEPs for the designated hosts 330, the CCP 320 provides a designated host VTEP list to each non-designated host 340 in the SDN 300. In some embodiments, the CCP 320 provides the list to an LCP module 342 in each non-designated host 340. After receiving the VTEP list, the LCP modules 342 store it in a data store 344 of the host 340.

Once the non-designated hosts 340 have the designated host VTEP list, the hosts 340 can migrate any machines executing on them to a designated host 330 without any information from the CCP 320. In some embodiments, while the CCP 320 is still operational, machine migration occurs as normal, where the hosts 330 and 340 can migrate any machines to any host in the SDN 300, and the CCP 320 can provide any LFE information to any host that needs it. When the CCP 320 is unavailable (e.g., when it goes down), the hosts 340 of some embodiments automatically migrate any machines only to the designated hosts 330 because the designated hosts 330 already have any LFE information they need to properly execute machine migration. In some embodiments, even when the CCP 320 is operational, the hosts 340 migrate machines only to the designated hosts 330, and the designated hosts 330 do not request any LFE information from the CCP 320.

Figure 4:
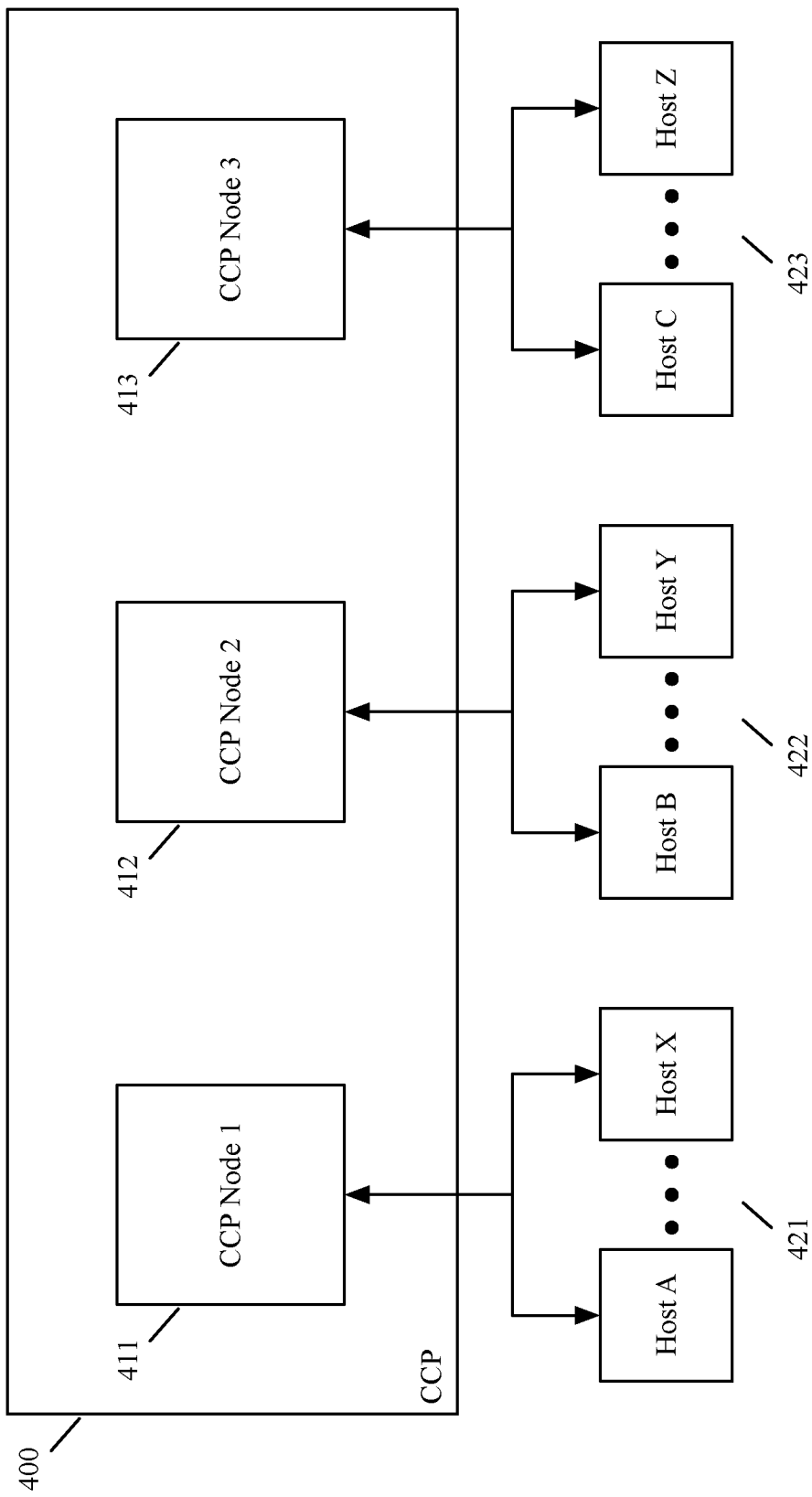
FIG. 4 illustrates an example CCP with multiple CCP nodes.

In some embodiments, a CCP is implemented by multiple controllers or nodes. FIG. 4 illustrates an example CCP 400 with three CCP nodes 411, 412, and 413. Each CCP node 411-413 is coupled to one or more hosts 421, 422, and 423, respectively, such that an LCP module executing on a host communicates with its coupled CCP node in order to communicate with the CCP. A CCP of some embodiments includes any number of CCP nodes, and each CCP node may communicate with any number of hosts. In such embodiments, some embodiments have a primary CCP node and one or more secondary CCP nodes. In these embodiments, the primary CCP node updates logical forwarding element information for the SDN, and replicates this information to the secondary CCP nodes. The CCP 400 is considered unavailable when all nodes 411-413 are unavailable, are disconnected, or have failed.

Figure 5:
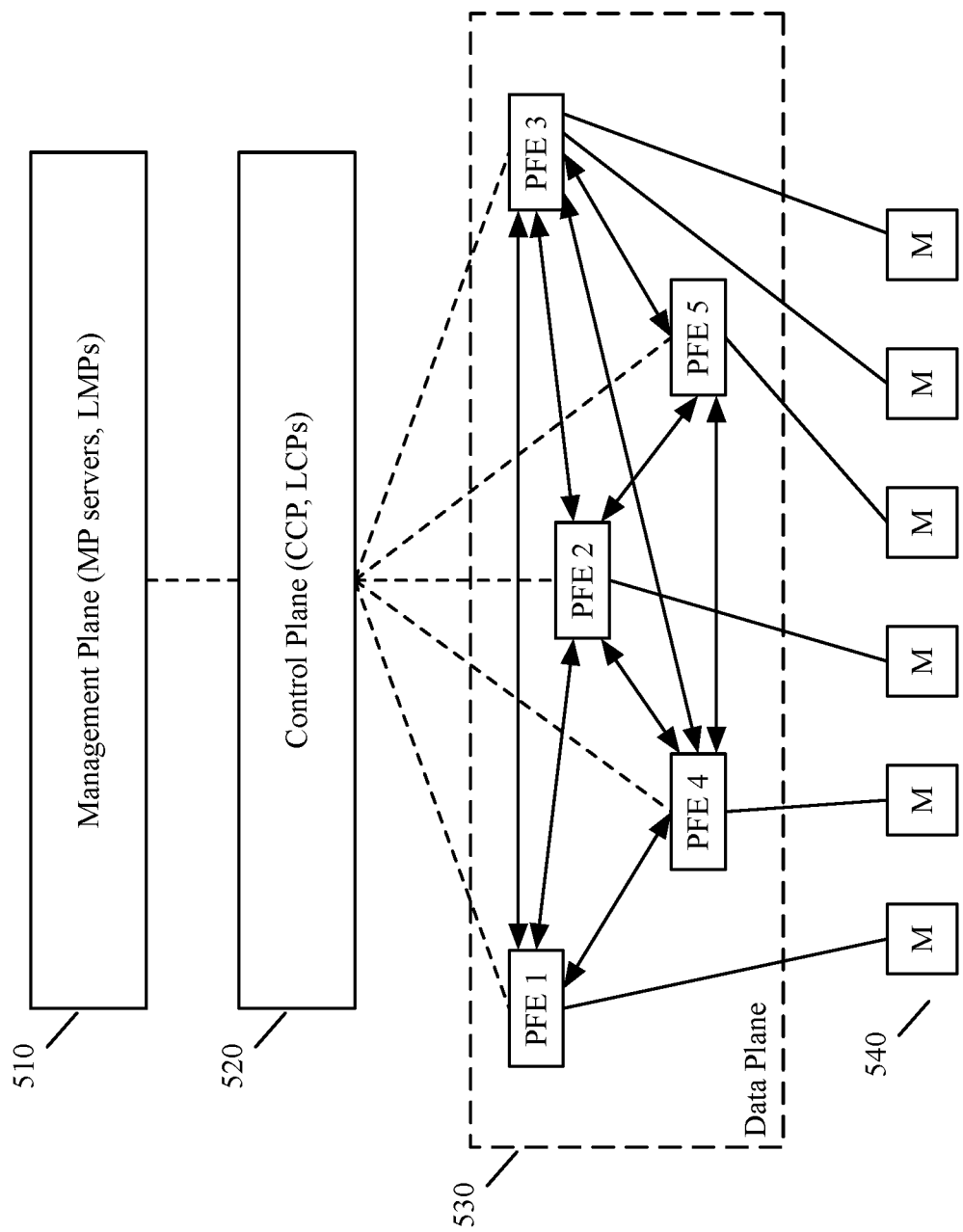
FIG. 5 illustrates the configuration of the management plane, control plane, and data plane of an SDN.

As discussed previously, the management plane of an SDN configures the control plane, and the control plane configures PFEs to implement the data plane. FIG. 5 illustrates the configuration of these planes. The management plane 510, consisting of management-plane servers and LMP modules, configures the CCP and LCP modules of the control plane 520. Using the configuration provided by the management plane 510, the control plane 520 configures PFEs to implement the data plane 530. The example data plane 530 includes 5 PFEs that communicate with each other. For instance, PFE 1 communicates with PFEs 2, 3, and 4, and PFE 2 communicates with PFEs 1, 3, 4, and 5. The datapaths through which the PFEs communicate implement the data plane 530. The PFEs also communicate with machines 540, i.e., source and destinations of data messages exchanged between the PFEs implementing the data plane 530.

Figure 6:
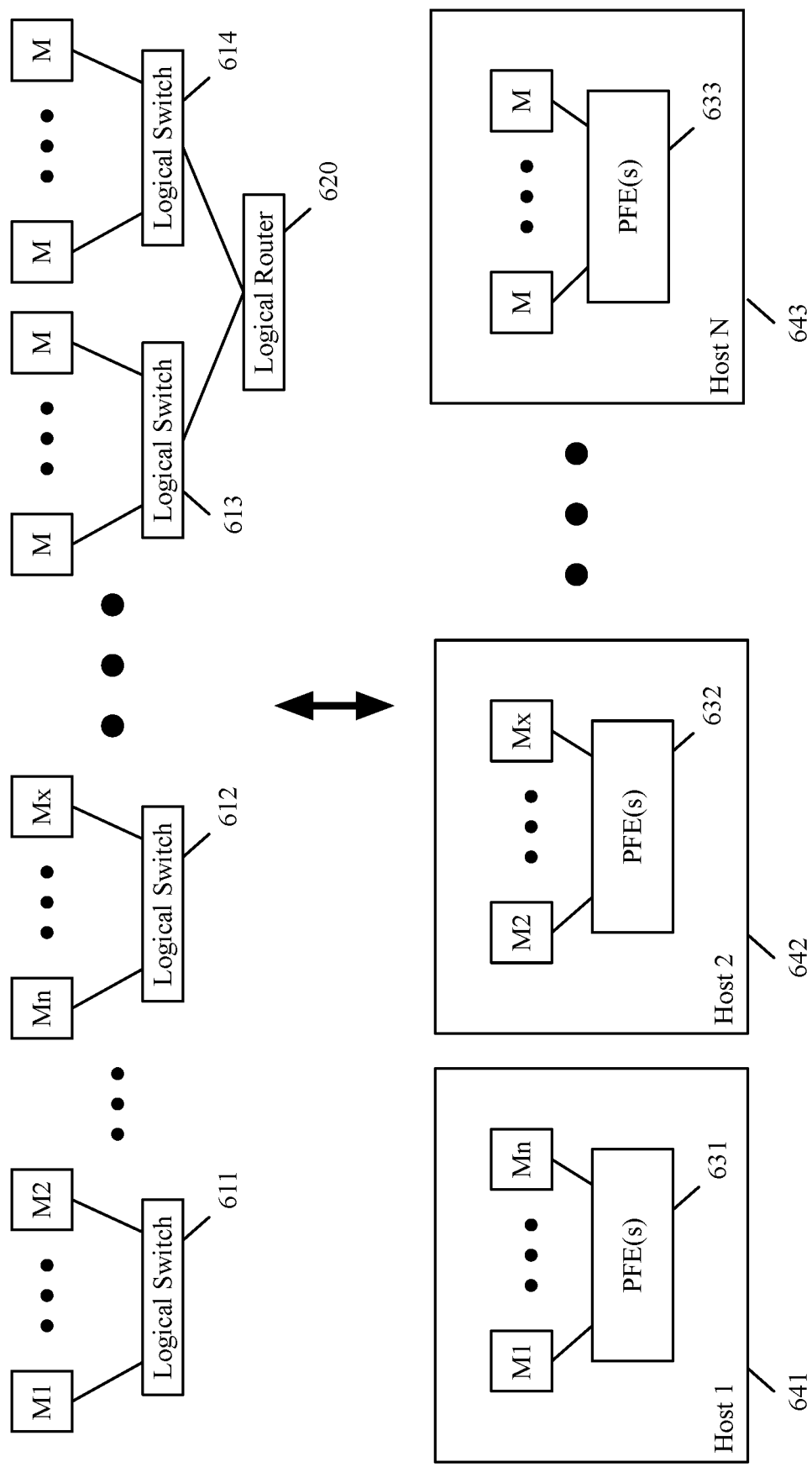
FIG. 6 illustrates an example of logical components of logical network defined across a shared set of physical forwarding elements of an SDN.

FIG. 6 illustrates an example of logical components 611-620 of logical networks defined across a shared set of physical forwarding elements 631-633 of an SDN. Specifically, this figure illustrates a number of machines (e.g., VMs) that execute physical forwarding elements 631-633 on several hosts 641-643. The shared physical forwarding elements 631-633 can implement any arbitrary number of logical switches and logical routers. One LFE can communicatively connect machines on different hosts. For example, the logical switch 611 connects machines M1 and M2 that execute on hosts 641 and 642, while the logical switch 612 connects machines Mn and Mx that execute on these two hosts.

The logical forwarding element or elements of one logical network isolate the data message communication between their network's machines from the data message communication between another logical network's VMs. In some embodiments, this isolation is achieved through the association of logical network identifiers (LNIs) with the data messages that are communicated between the logical network's machines. In some of these embodiments, such LNIs are inserted in tunnel headers of the tunnels that are established between the shared network elements (e.g., the hosts, standalone service appliances, standalone forwarding elements, etc.).

In hypervisors, software switches are sometimes referred to as virtual switches because they are software, and they provide the VMs with shared access to the physical network interface cards (PNICs) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in "VXLAN: A Framework for Overlaying Virtualized Layer 2 Networks over Layer 3 Networks" by Mahalingam, Mallik, et al., Internet Engineering Task Force (IETF) Internet Draft, May 8, 2013. Host service modules and standalone service appliances (not shown) may also implement any arbitrary number of logical distributed middleboxes for providing any arbitrary number of services in the logical networks. Examples of such services include firewall services, load balancing services, DNAT services, etc.

Figure 7:
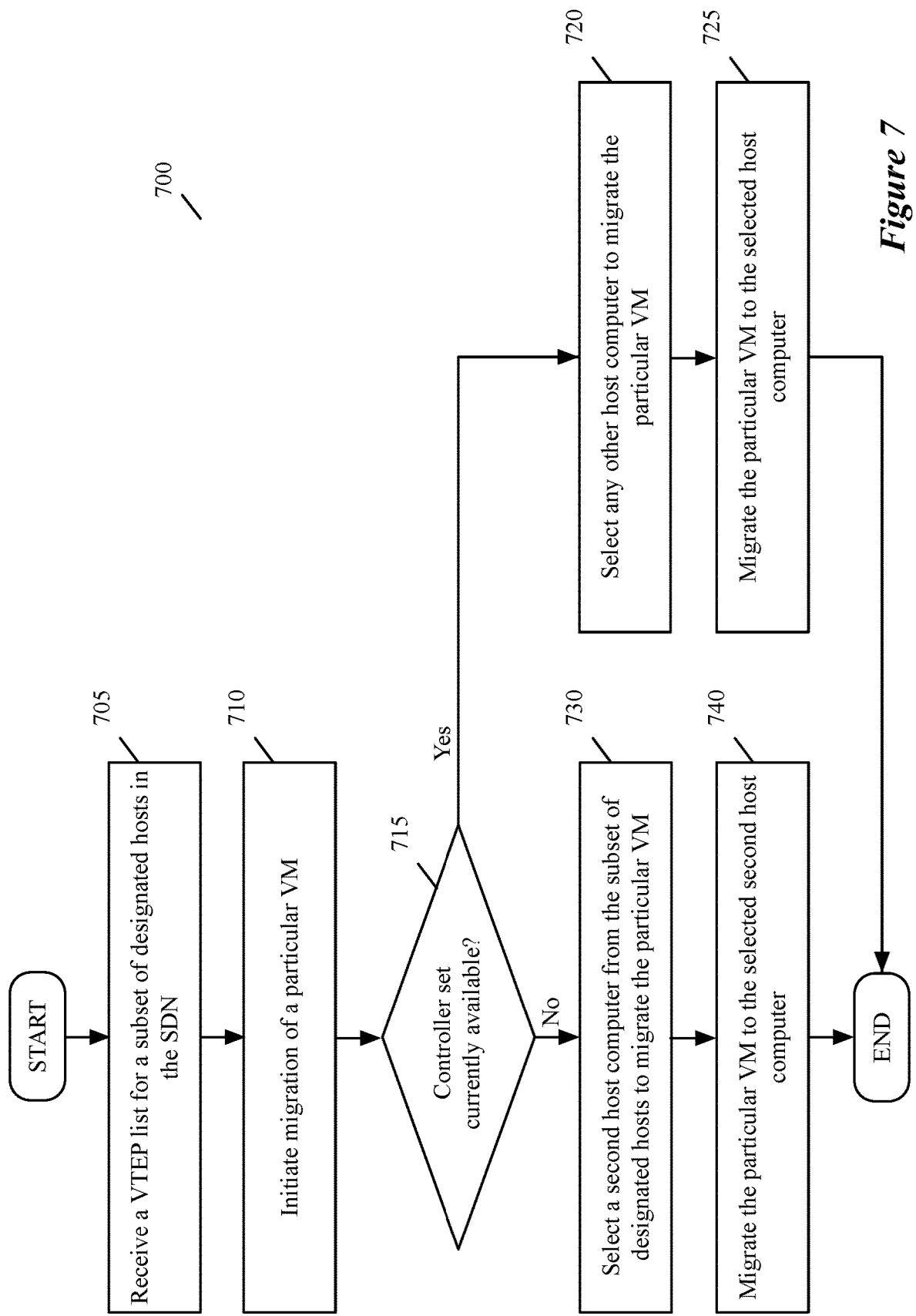
FIG. 7 conceptually illustrates a process of some embodiments for migrating a machine from a first host computer in an SDN to another host computer in the SDN.

As discussed previously, when the CCP of an SDN is unavailable during a machine migration, the destination host receiving the machine cannot receive any LFE information related to the migrating machine from the CCP. In order to obviate this issue, some embodiments designate a subset of hosts in an SDN as designated hosts that store all LFE information for the SDN. FIG. 7 conceptually illustrates a process 700 of some embodiments for migrating a machine from a first host computer in an SDN to another host computer in the SDN. The process 700 of some embodiments is performed by the first host, which may also be referred to as the source host of the migrating machine. In some embodiments, the first host is not a designated host of the SDN. In other embodiments, the first host is a designated host of the SDN.

The process 700 begins by receiving (at 705) a VTEP list for a subset of designated host computers in the SDN. The first host of some embodiments receives the VTEP list specifying the IP addresses of each designated host in the SDN. The designated hosts of the SDN are in some embodiments selected by a user to store LFE information for the SDN.

In some embodiments, the designated host VTEP list is received from a set of one or more controllers of the SDN implementing a CCP. The first host of some embodiments, in receiving the designated host VTEP list, is notified by the CCP that when the first host is to migrate any machine from itself to another host, it has to migrate it to one of the designated hosts when the CCP is unavailable. In some embodiments, the first host is notified of this by receiving a message from the CCP to add a step in its RIB. After receiving the VTEP list from the controller set, the first host stores the received VTEP list in a data store of the first host. In some embodiments, the data store is a database of the first host.

Then, the process 700 initiates (at 710) migration of a particular VM. In some embodiments, the first host includes a VM migration module that performs machine migration. Some embodiments initiate VM migration using the VM migration module or a resource scheduling and load balancing application, program, or module (e.g., a distributed resource scheduler (DRS) offered by VMware, Inc.) that automatically migrates VMs based on various parameters. Such parameters include central processing unit (CPU) usage, memory usage, and any suitable parameter related to the VMs and/or the host computers on which they execute.

Next, the process 700 determines (at 715) whether the controller set of the SDN is currently available. In some embodiments, the controller set (i.e., the CCP) of the SDN is unavailable if the controller set loses connection to the first host, fails and hasn't yet restarted, etc. The first host determines whether the controller set is currently available in order to know whether to perform migration of the particular VM as normal or to perform migration of the particular VM using the designated host VTEP list. In some embodiments, when the controller set is unavailable, the LCP module of the first host sends a heartbeat message to the controller set to determine whether it is available.

If the process 700 determines that the controller set is currently available, the process 700 selects (at 720) any other host computer in the SDN to migrate the particular VM. Because the controller set is currently available, the destination host computer of the particular VM is able to request any necessary LFE information associated with the particular VM from the controller set. The first host computer can select any host computer in the SDN, including a designated host computer or a non-designated host computer. Then, the process 700 migrates (at 725) the particular VM to the selected host computer, and the process 700 ends.

If the process 700 determines, at 715, that the controller set of the SDN is currently unavailable, the process 700 selects (at 730) a second host computer from the subset of designated hosts specified in the VTEP list to migrate the particular VM. Because the controller set is unavailable, the destination host of the particular VM needs to already have the LFE information associated with the particular VM (i.e., the destination host has to be a designated host) in order for the particular VM to migrate seamlessly and keep running. In some embodiments, instead of selecting a designated host from the VTEP list, the first host of some embodiments directly sends a message to each other host in the SDN asking whether it is a designated host or not. In such embodiments, each other host replies to the first host to tell the first host whether it is or is not a designated host. After learning which hosts are designated hosts, the first host can select one of these hosts for migrating the particular VM.

In embodiments where the VM migration is initiated by a resource scheduling and load balancing application, as described above, the process 700, at 730, notifies the resource scheduling and load balancing application that the designated hosts are the only hosts in the SDN compatible for being destination hosts of a migration. In such embodiments, the resource scheduling and load balancing application is then able to migrate any VMs to any of the designated hosts.

After selecting the second host computer, the process 700 migrates (at 740) the particular VM to the selected second host computer. In some embodiments, in migrating the particular VM, the first host computer provides logical switch port information associated with the particular VM. In such embodiments, this information is automatically provided to the second host computer, even when the second host computer is a designated host. Logical switch port information is not provided along with logical router, logical router port, and logical switch information to designated hosts by the controller set in some embodiments in order to save storage space, which will be further described below. After migrating the particular VM to the selected second host computer, the process 700 ends.

Figure 8:
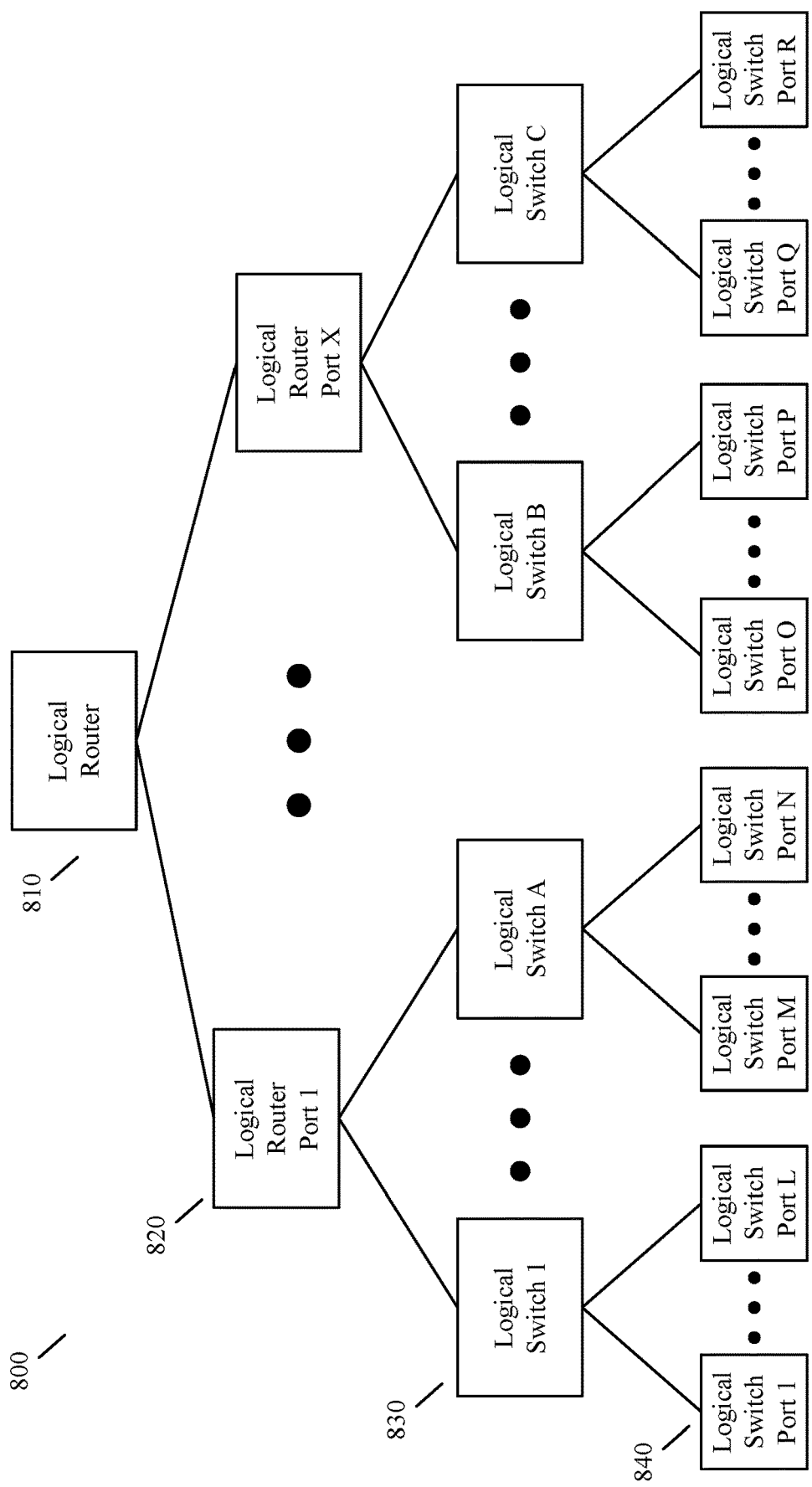
FIG. 8 illustrates a dependency tree for logical entities of a logical network.

FIG. 8 illustrates a dependency tree 800 for logical entities of a logical network. The dependency tree 800 illustrates each logical entity of a logical network and which logical entities are dependent on it. The dependency tree 800 includes a logical router 810. One or more logical router ports 820 are dependent on the logical router 810. Any number of logical router ports 820 can be dependent on a single logical router 810.

One or more logical switches 830 are dependent on each logical router port 820 of the logical router 810. Any number of logical switches 830 may be dependent on a single logical router port 820, and different logical router ports 820 can be associated with different numbers of logical switches 830. Each logical switch 830 is associated with one or more logical switch ports 840. Any number of logical switch ports 840 can be dependent on a single logical switch 830. Different logical switches 830 can be associated with different numbers of logical switch ports 840.

As shown, for one logical router 810, there can be a much larger number of logical switch ports 840. In some embodiments, multiple logical routers are implemented for a single SDN, which further increases the number of logical switch ports. In order to save storage space on designated hosts, a CCP of some embodiments does not provide logical switch port information to designated hosts, and only provides logical router, logical router port, and logical switch information. When a designated host receives a machine during a migration, the source host of the machine provides the relevant logical switch port information automatically, so the designated host does not need to store all of the logical switch port information for the entire SDN.

Figure 9:
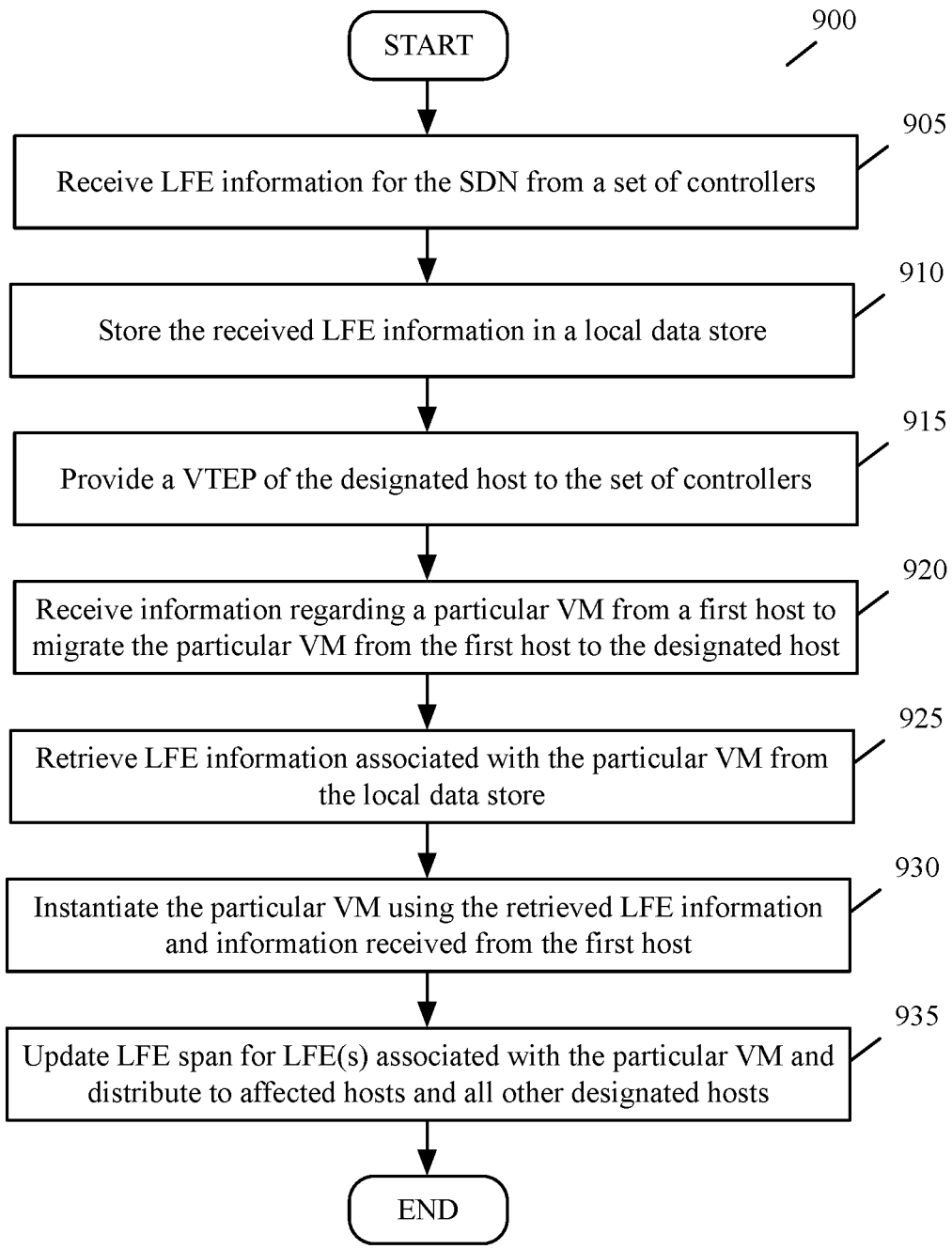
FIG. 9 conceptually illustrates a process of some embodiments for migrating a machine to a designated host of an SDN.

FIG. 9 conceptually illustrates a process 900 of some embodiments for migrating a VM to a designated host of an SDN. The process 900 of some embodiments is performed by the designated host. The process 900 begins by receiving (at 905) LFE information for the SDN from a set of one or more controllers. The designated host of some embodiments receives, from the controller set (i.e., the CCP of the SDN) LFE information for several LFEs implemented in the SDN. The LFE information is received in some embodiments by an LCP module of the designated host. In some embodiments, the received LFE information includes logical router information, logical router port information, and logical switch information for the entire SDN. This LFE information is provided to the designated host in some embodiments in order to be able to perform machine migration even when the controller set is unavailable during the migration.

Next, the process 900 stores (at 910) the received LFE information in a local data store. In some embodiments, the LCP module of the designated host stores the LFE information in a data store of the designated host. The data store is in some embodiments a local database of the designated host. Then, the process 900 provides (at 915) a VTEP of the designated host to the controller set. The designated host of some embodiments provides a VTEP (i.e., an IP address) of itself to the controller set in order for the controller to provide it to other hosts. The other hosts in some embodiments receive a VTEP list of all designated hosts in the SDN so they know to migrate any machines to the designated hosts in the event of controller unavailability. In some embodiments, after providing its own VTEP, the designated host receives from the controller set a VTEP list for all designated hosts in the SDN. In such embodiments, the designated host stores the designated host VTEP list in a local data store (which may be the same data store that stores the LFE information or a different data store) so the designated host can migrate machines to other designated hosts when the controller set is unavailable.

At 920, the process receives information regarding a particular VM from a first host computer in the SDN to migrate the particular VM from the first host to the designated host. The designated host of some embodiments receives information regarding the particular VM from the first host in order for the designated host to instantiate the particular VM on the designated host. In some embodiments, the particular VM's information is received at the LCP module of the designated host. In other embodiments, it is received at a VM migration module of the designated host. The designated host of some embodiments receives, from the first host, configuration information, network forwarding information, middlebox service information, and/or logical switch port information associated with the particular VM.

Then, at 925, the process 900 retrieves LFE information associated with the particular VM from the local data store. The LCP module or VM migration module of the designated host retrieves, in some embodiments, all LFE information relevant to the particular VM from the local data store of the designated host. The retrieved LFE information in some embodiments includes logical router information, logical router port information, and logical switch information associated with the particular VM. Because this information is stored by the designated host, the designated host does not need to request it from the controller set. This ensures that that the particular VM can be migrated to the designated host seamlessly, even when the controller is unavailable during the migration.

Next, the process 900 instantiates (at 930) the particular VM on the designated host using the retrieved LFE information and information received from the first host. With all of the information received from the first host and retrieved from the local data store for the particular VM, the designated host instantiates the particular VM on the designated host. This is performed by the LCP module of the designated host in some embodiments and by the VM migration module of the designated host in other embodiments. In some embodiments, the information received from the first host is stored in a local data store of the designated host along with information for other VMs executing on the designated host.

Lastly, the process 900 updates (at 935) the LFE span for any LFEs associated with the particular VM and distributes the updated LFE spans to any affected hosts and all other designated hosts in the SDN. In some embodiments, migrating the particular VM from the first host to the designated host causes the span of each LFE associated with the particular VM to change. For example, before the migration, a particular logical router of some embodiments spans a first set of hosts in the SDN including the first host, but not including the designated host. After the migration, because the particular VM now executes on the designated host, the logical router spans a second set of hosts that does not include the first host but does include the designated host. The designated host needs to update the span for each LFE affected by the migration.

Once the designated host updates the span for each affected LFE, the designated host distributes the updated LFE spans to the hosts associated with these LFEs so that they know the updated span for these LFEs. The designated host also distributes the updated LFE spans to the other designated hosts in the SDN, so they can update their stored LFE information. Once the updated LFE span information has been distributed, the process 900 ends.

Figure 10:
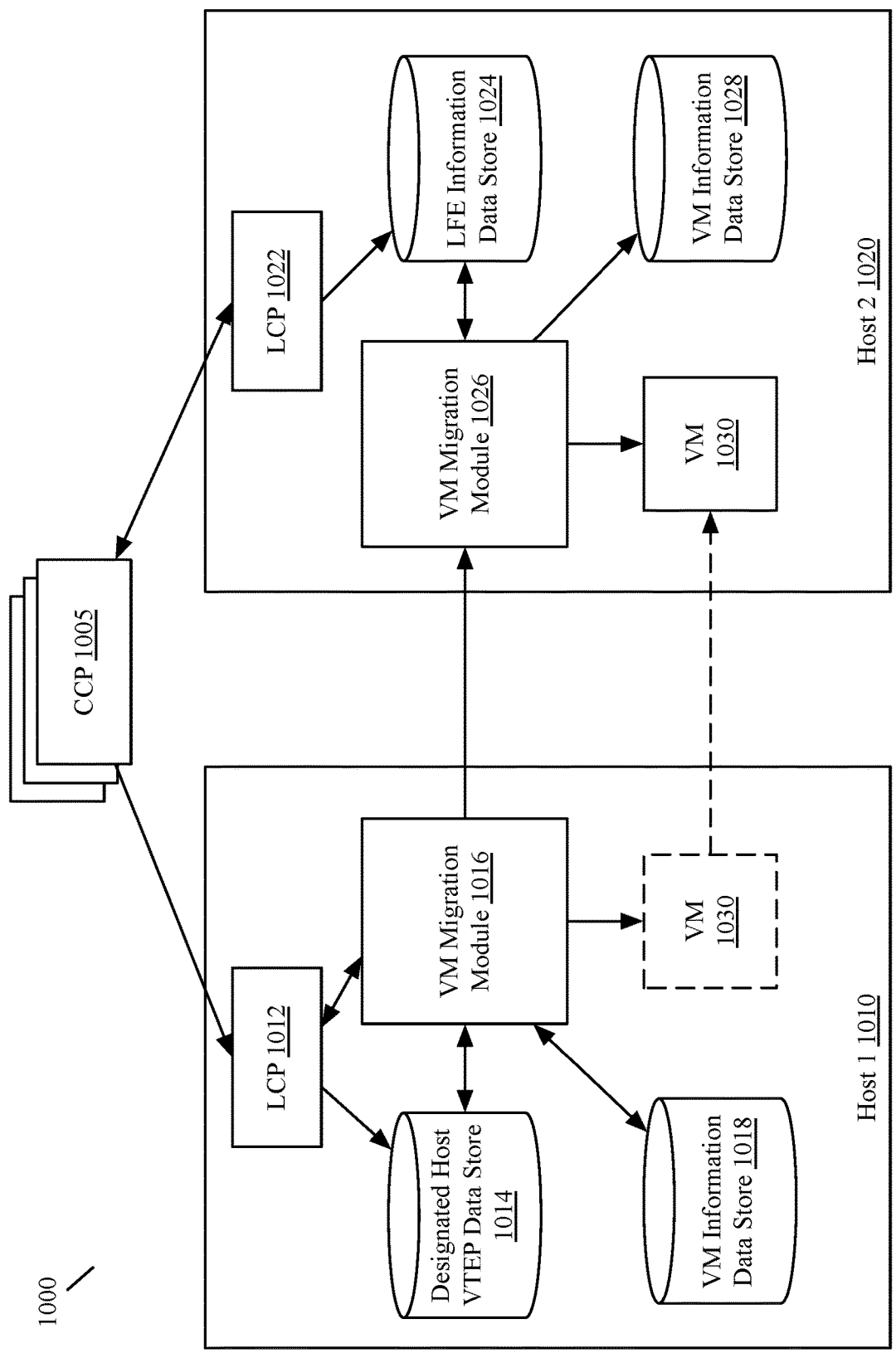
FIG. 10 illustrates an example SDN that includes a first host migrating a VM to a designated second host when the CCP of the SDN is unavailable.

FIG. 10 illustrates an example SDN 1000 that includes a CCP 1005, a first host 1010, and a second host 1020. In this example, the second host 1020 is designated as a designated host by a user (e.g., through a management plane of the SDN 1000). When the user specifies the second host 1020 as a designated host (along with other hosts (not shown) in the SDN 1000), the CCP 1005 provides LFE information for the SDN 1000 to an LCP module 1022 of the second host 1020. The LCP module 1022 stores the received LFE information in a data store 1024.

The LCP module 1022 also provides a VTEP of the second host 1020 to the CCP 1005 in response to receiving the LFE information. This VTEP (i.e., IP address) is provided to the CCP 1005 so the CCP 1005 can create a VTEP list for all designated hosts in the SDN 1000. After receiving VTEPs for each designated host including the second host 1020, the CCP 1005 provides the designated host VTEP list to an LCP module 1012 of the first host 1010, which is not a designated host. The LCP module 1012 receives the designated host VTEP list and stores it in a data store 1014 for the first host to use to migrate VMs to other hosts when the CCP 1005 is unavailable.

In some embodiments, the first host 1010 includes a VM migration module 1016, which is a module, program, or application of the first host 1010 that handles VM migration. When the VM migration module 1016 wishes to migrate a VM 1030 from the first host 1010 to another host in the SDN 1000, the VM migration module 1016 of some embodiments determines whether the CCP 1005 is currently available. In some embodiments, the VM migration module 1016 sends a heartbeat message to the CCP 1005 through the LCP module 1012. If the VM migration module receives a response from the CCP 1005, the VM migration module 1016 knows the CCP 1005 is currently operational and can migrate the VM 1030 to any other host in the SDN 1000, including non-designated hosts, because the destination host can receive necessary LFE information from the CCP 1005.

The VM migration module 1016 of some embodiments determines that the CCP 1005 is unavailable if it does not receive a response message from the CCP 1005 after a particular period of time, or if the VM migration module 1016 receives an error message from the LCP module 1012. In this example, the VM migration module 1016 determines that the CCP 1005 is unavailable, and selects the second host 1020 to migrate the VM 1030 to because it is a designated host. Using the designated host VTEP list stored in the data store 1014, the VM migration module 1016 identifies the second host 1020 and retrieves the VTEP (e.g., the IP address) for the second host 1020.

The VM migration module 1016 also retrieves information regarding the VM 1030 from a VM information data store 1018. This data store 1018 stores all information for all VMs executing on the host 1010. In some embodiments, the information stored for each VM includes configuration information, network forwarding information, middlebox service information, and logical switch port information associated with the VM. In some embodiments, one data store 1014 is used to store the designated host VTEP list and another data store 1018 is used to store the VM information. In other embodiments, a single data store of the host 1010 is used to store both the VTEP list and the VM information.

To migrate the VM 1030 from the first host 1010 to the second host 1020, the VM migration module 1016 retrieves the VM's information from the data store and provides it to a VM migration module 1026 of the second host 1020. The VM migration module 1026 receives the VM's information and stores it in a VM information data store 1028 of the second host 1020. This data store 1028 stores VM information for each VM executing on the host 1020, which now includes the VM 1030. The VM migration module 1026 also retrieves LFE information associated with the VM 1030 from the data store 1024 that the LCP module 1022 stored the SDN's LFE information. In some embodiments, one data store 1024 is used to store the LFE information for the SDN 1000 and another data store 1028 is used to store the VM information. In other embodiments, a single data store of the host 1020 is used to store both the LFE information and the VM information.

In some embodiments, the VM migration module retrieves logical router, logical router port, and logical switch information associated with the VM 1030 from the data store 1024. The VM migration module 1026 of some embodiments receives logical switch port information from the VM migration module 1016, and stores it in the LFE information data store 1024. In other embodiments, the VM migration module 1026 stores it in the VM information data store 1028. Using the LFE information retrieved from the data store 1024 and the information received from the VM migration module 1016 of the first host 1010, the VM migration module 1026 is able to instantiate the VM 1030 on the second host 1020, completing the VM migration.

After completing the migration, the VM migration module 1026 of some embodiments updates the LFE information associated with the VM 1030 to indicate that the VM 1030 now executes on the second host 1020. After updating the LFE information, the VM migration module 1026 provides the updated LFE information to the other hosts associated with the LFE information (e.g., any hosts executing other VMs associated with the same LFEs as the VM 1030) and to the other designated hosts in the SDN 1000.

In some embodiments, because machines can migrate between hosts, when a first host needs to forward a data message from a source VM executing on itself to a destination VM on another host, the first host does not know the network address. In such embodiments, the first host sends a broadcast, unknown-unicast and multicast (BUM) message to multiple hosts that may be executing the destination VM. For instance, when the destination VM is associated with a particular LFE, the first host in some embodiments sends the BUM message to all hosts that the LFE spans and all designated hosts. This is because if the destination VM was migrated to a designated host, and the first host has not yet been notified, the first host ensures that all hosts that could be currently executing the destination VM receive the BUM message. When the host executing the destination VM receives the BUM message, it sends, in some embodiments, a reply message back to the first host including its network address (e.g., media access control (MAC) address) for the first host to learn the network address of the destination VM.

Figure 11:
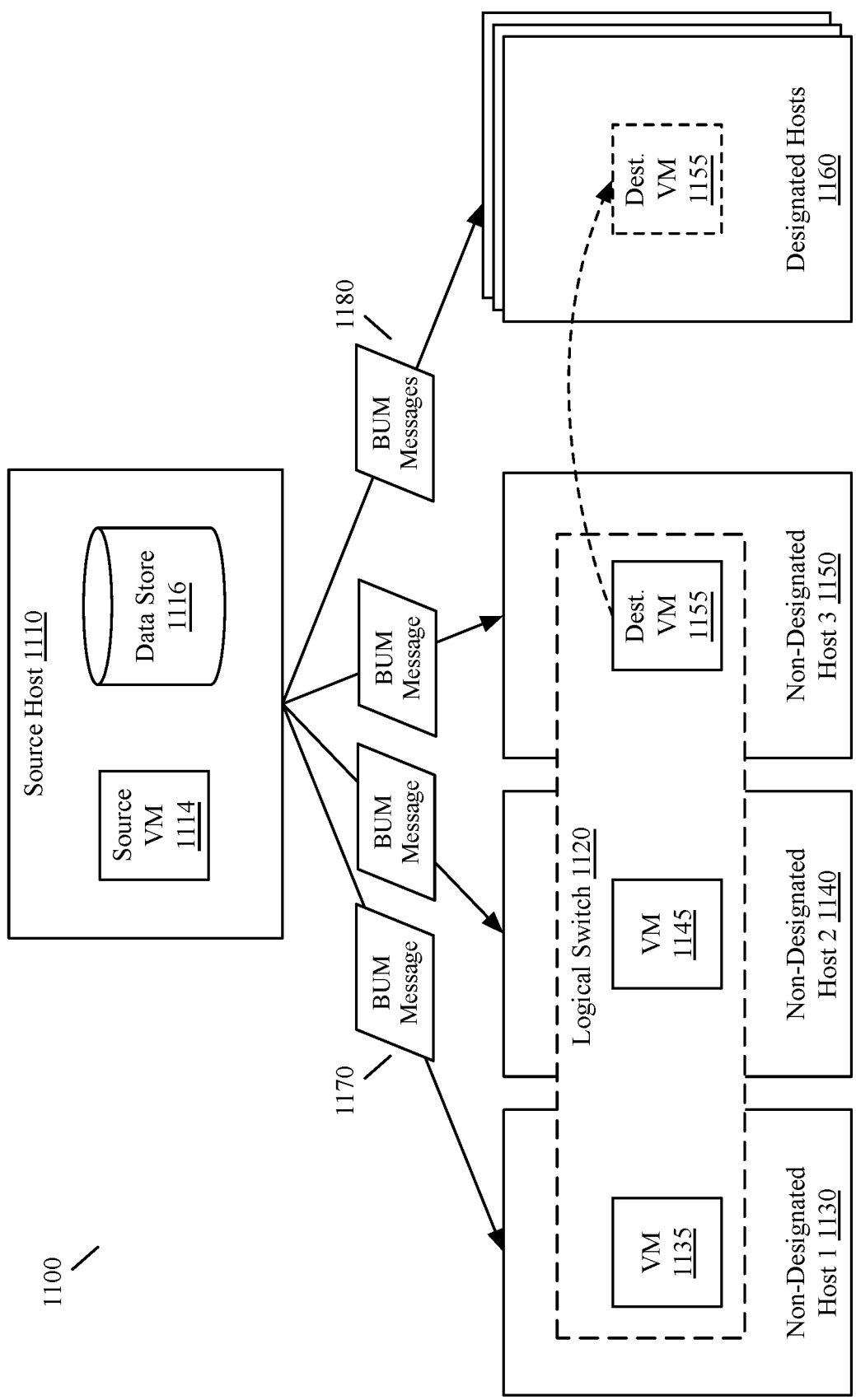
FIG. 11 illustrates an example SDN of some embodiments that includes a source host that needs to send data message flows to from a source VM to a destination VM executing on an unknown host in the SDN.

FIG. 11 illustrates an example SDN 1100 of some embodiments that includes a source host 1110 that needs to send data message flows to from a source VM 1114 to a destination VM 1155 executing on an unknown host in the SDN 1100. In this example, the source host 1110 knows that the destination VM 1155 is associated with a logical switch 1120. The logical switch 1120 spans three VMs 1135, 1145, and 1155 executing on three hosts 1130, 1140, and 1150.

In this example, the source host 1110 does not know the host on which the destination VM 1155 executes. However, the source host 1110 does know the span of the logical switch 1120 associated with the destination VM 1155, namely the source host 1110 knows a set of possible hosts 1130, 1140, and 1150 on which the destination VM 1155 executes. To find out the host on which the destination VM 1155 executes, the source host 1110 sends a BUM message 1170 to each host 1130, 1140, and 1150 that the logical switch 1120 spans.

However, the SDN 1100 in this example includes a set of one or more designated hosts 1160. Because the destination VM 1155 is able to be migrated to any designated host 1160 in the SDN, the source host 1110 sends also BUM messages 1180 to each designated host 1160 because the destination VM 1155 might have been migrated to any of these designated hosts. By sending BUM messages to all hosts spanned by the logical switch 1120 and all designated hosts 1160, the source host 1110 ensures that the BUM message will reach the host currently executing the destination VM 1155 and that it will receive a reply message identifying the network address it needs to use to forward flows from the source VM 1114 to the destination VM 1155.

Once the source host 1110 receives the reply message identifying the network address to use to send the flows to the destination VM 1155, the source host 1110 of some embodiments stores the network address in a data store 1116 that stores VMs and their associated network addresses for forwarding flows.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
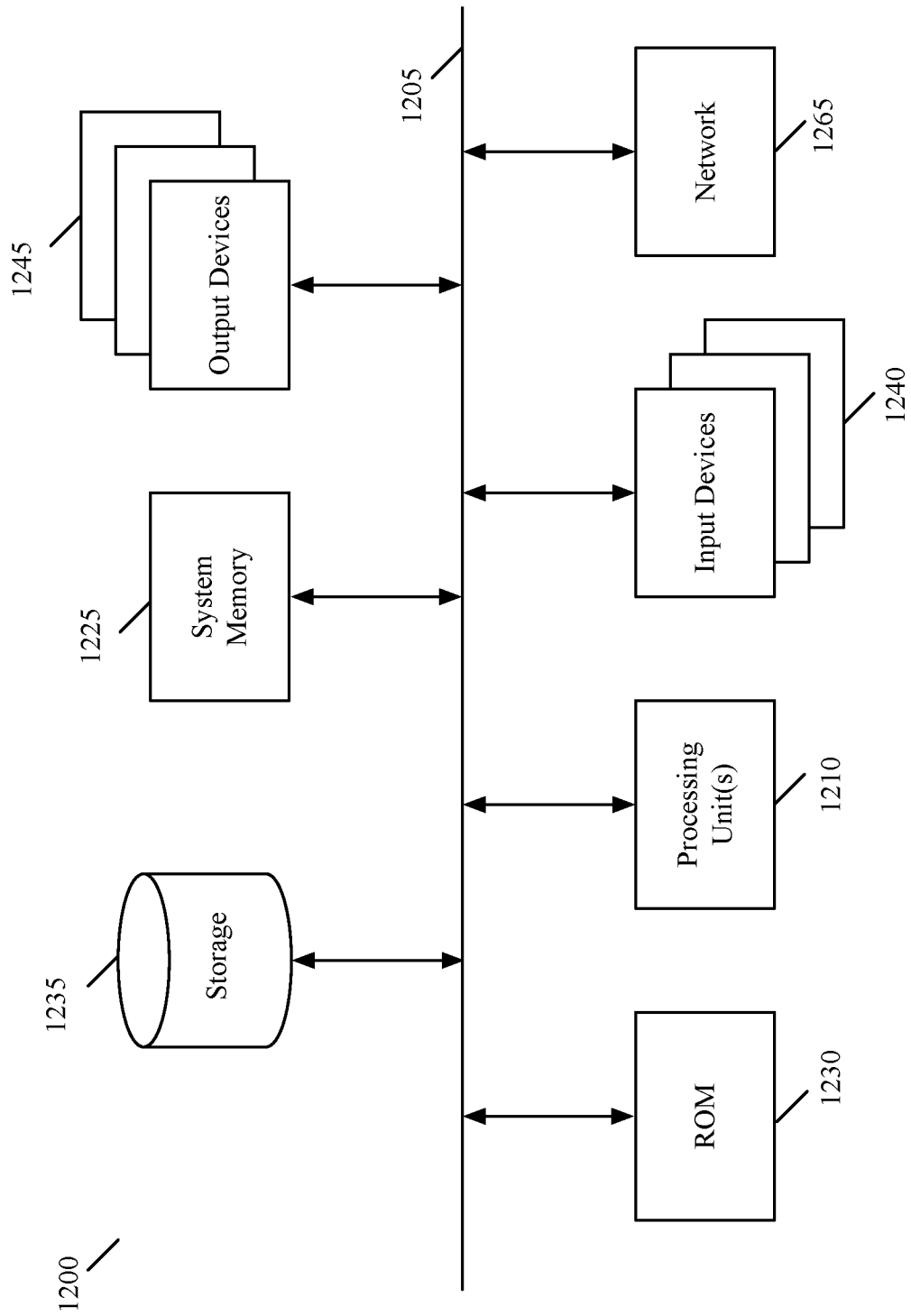
FIG. 12 conceptually illustrates an electronic system with which some embodiments of the invention are implemented.

FIG. 12 conceptually illustrates a computer system 1200 with which some embodiments of the invention are implemented. The computer system 1200 can be used to implement any of the above-described computers and servers. As such, it can be used to execute any of the above described processes. This computer system includes various types of non-transitory machine readable media and interfaces for various other types of machine readable media. Computer system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the computer system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments. The read-only-memory (ROM) 1230 stores static data and instructions that are needed by the processing unit(s) 1210 and other modules of the computer system. The permanent storage device 1235, on the other hand, is a read-and-write memory device. This device is a non-volatile memory unit that stores instructions and data even when the computer system 1200 is off. Some embodiments of the invention use a mass-storage device (such as a magnetic or optical disk and its corresponding disk drive) as the permanent storage device 1235.

Other embodiments use a removable storage device (such as a flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the computer system. The input devices 1240 include alphanumeric keyboards and pointing devices (also called "cursor control devices"). The output devices 1245 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples computer system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of computer system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 2, 7, and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for migrating a particular virtual machine (VM) from a first host computer to a second host computer in a software-defined network (SDN) when a set of one or more controllers of the SDN, that configures a plurality of forwarding elements in the SDN to implement one logical forwarding element (LFE), is unavailable, the method comprising:

at the second host computer:
receiving information regarding the particular VM from the first host computer, wherein the particular VM is associated with the LFE;
retrieving, from a local data store of the second host computer, configuration information for configuring at least one software forwarding element executing on the second host computer to implement the LFE, wherein the configuration information was previously received from the set of controllers when the set of controllers was available in order to pre-configure the second host computer to implement the LFE without assistance from the set of controllers when the particular VM migrates to the second host computer; and
using the received information for the particular VM and the retrieved configuration information for the LFE to instantiate the particular VM on the second host computer without requesting any information from the set of controllers.

2. The method of claim 1, wherein the information received from the second host computer comprises one or more of configuration information, network forwarding information, and middlebox service information related to the particular VM.

3. The method of claim 1, wherein the LFE is a logical router and the configuration information for the LFE comprises information regarding the logical router and one or more logical router ports of the logical router.

4. The method of claim 1, wherein the LFE is a logical switch and the configuration information for the LFE comprises information regarding the logical switch.

5. The method of claim 4, wherein the information received from the first host computer comprises configuration information relating to one or more logical switch ports of the logical switch.

6. The method of claim 1 further comprising:
after instantiating the particular VM:
updating the configuration information to indicate that the particular VM now executes on the second host computer; and
distributing the updated configuration information to a set of host computers in the SDN.

7. The method of claim 6, wherein the set of host computers comprises host computers associated with the LFE and host computers that also store the configuration information for the LFE.

8. The method of claim 1, wherein the second host computer is designated by a user as a designated host of the SDN for migrating one or more VMs including the particular VM.

9. The method of claim 8, wherein a set of one or more designated hosts, including the second host computer, is designated by the user to store the configuration information needed for migration and to be destination hosts of migrating VMs when the set of controllers is unavailable.

10. The method of claim 9, wherein the first host computer stores a list specifying the set of designated hosts in order to migrate the particular VM when the set of controllers is unavailable.

11. The method of claim 10, wherein the list specifies a network address for each designated host.

12. The method of claim 9, wherein the user specifies the set of designated hosts through a set of one or more management servers of the SDN.

13. The method of claim 12, wherein the user specifies the list using an Application Programming Interface (API) call.

14. The method of claim 12, wherein the user specifies the list through a graphical user interface (GUI).

15. The method of claim 14, wherein the GUI comprises a drop down menu for the user to select one or more host computers in the SDN to include in the set of designated hosts.

16. A non-transitory machine readable medium storing a program for execution by at least one processing unit for migrating a particular virtual machine (VM) from a first host computer to a second host computer in a software-defined network (SDN) when a set of one or more controllers of the SDN, that configures a plurality of forwarding elements in the SDN to implement one logical forwarding element (LFE), is unavailable, the program comprising sets of instructions for:

at the second host computer:
receiving information regarding the particular VM from the first host computer, wherein the particular VM is associated with the LFE;
retrieving, from a local data store of the second host computer, configuration information for configuring at least one software forwarding element executing on the second host computer to implement the LFE, wherein the configuration information was previously received from the set of controllers when the set of controllers was available in order to pre-configure the second host computer to implement the LFE without assistance from the set of controllers when the particular VM migrates to the second host computer; and
using the received information for the particular VM and the retrieved configuration information for the LFE to instantiate the particular VM on the second host computer without requesting any information from the set of controllers.

17. The non-transitory machine readable medium of claim 16, wherein the LFE is a logical switch and the configuration information for the LFE comprises information regarding the logical switch.

18. The non-transitory machine readable medium of claim 17, wherein the information received from the first host computer comprises configuration information relating to one or more logical switch ports of the logical switch.

19. The non-transitory machine readable medium of claim 16, wherein the program further comprises sets of instructions for:
after instantiating the particular VM:
updating the configuration information to indicate that the particular VM now executes on the second host computer; and
distributing the updated configuration information to a set of host computers in the SDN.

20. The non-transitory machine readable medium of claim 15, wherein:
- the second host computer is designated by a user as a designated host of the SDN for migrating one or more VMs including the particular VM, and
- a set of one or more designated hosts, including the second host computer, is designated by the user to store the configuration information needed for migration and to be destination hosts of migrating VMs when the set of controllers is unavailable.

* * * * *